(12) United States Patent
Gally et al.

(10) Patent No.: US 7,808,703 B2
(45) Date of Patent: Oct. 5, 2010

(54) SYSTEM AND METHOD FOR IMPLEMENTATION OF INTERFEROMETRIC MODULATOR DISPLAYS

(75) Inventors: Brian J. Gally, Los Gatos, CA (US); William J. Cummings, Millbrae, CA (US)

(73) Assignee: QUALCOMM MEMS Technologies, Inc., San Diego, CA (US)

(*) Notice: Subject to any disclaimer, the term of this patent is extended or adjusted under 35 U.S.C. 154(b) by 1107 days.

(21) Appl. No.: 11/140,560

(22) Filed: May 27, 2005

(65) Prior Publication Data

US 2006/0077393 A1   Apr. 13, 2006

Related U.S. Application Data

(60) Provisional application No. 60/613,298, filed on Sep. 27, 2004.

(51) Int. Cl.
*G02B 27/22* (2006.01)

(52) U.S. Cl. .......................... 359/462; 348/54

(58) Field of Classification Search ............... None
See application file for complete search history.

(56) References Cited

U.S. PATENT DOCUMENTS

| | | |
|---|---|---|
| 2,534,846 A | 12/1950 | Ambrose et al. |
| 3,184,600 A | 5/1965 | Potter |
| 3,371,345 A | 2/1968 | Lewis |
| 3,410,363 A | 11/1968 | Schwartz |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,746,785 A | 7/1973 | Te Velde |
| 3,813,265 A | 5/1974 | Marks |
| 3,955,880 A | 5/1976 | Lierke |
| 4,099,854 A | 7/1978 | Decker et al. |
| 4,228,437 A | 10/1980 | Shelton |

(Continued)

FOREIGN PATENT DOCUMENTS

EP    0261897 A2    3/1988

(Continued)

OTHER PUBLICATIONS

Miles et al., 10.1: Digital Paper™ for reflective displays, SID 02 Digest, pp. 115-117, 2002.

(Continued)

*Primary Examiner*—Lee Fineman
(74) *Attorney, Agent, or Firm*—Knobbe Martens Olson & Bear, LLP

(57) ABSTRACT

This invention generally relates to methods and systems for providing three-dimensional displays. In one embodiment, a system for displaying to a user a stereoscopic image has pixels formed on a single substrate, wherein each pixel has at least one interferometric modulator, and wherein the system is configured to display a first image to a first eye of the user and to display a second image to a second eye of the user. Directional display of the two portions of the stereoscopic image is implemented by fashioning two sets of interferometric modulators, one set inclined at a first angle with respect to the substrate, and the second set inclined at a second angle with respect to the substrate.

28 Claims, 9 Drawing Sheets

U.S. PATENT DOCUMENTS

| | | |
|---|---|---|
| 4,347,983 A | 9/1982 | Bodai |
| 4,377,324 A | 3/1983 | Durand et al. |
| 4,389,096 A | 6/1983 | Hori et al. |
| 4,392,711 A | 7/1983 | Moraw et al. |
| 4,403,248 A | 9/1983 | te Velde |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,859,060 A | 8/1989 | Katagiri et al. |
| 4,900,136 A | 2/1990 | Goldburt et al. |
| 4,900,395 A | 2/1990 | Syverson et al. |
| 4,954,789 A | 9/1990 | Sampsell |
| 4,956,619 A | 9/1990 | Hornbeck |
| 4,965,562 A | 10/1990 | Verhulst |
| 4,977,009 A | 12/1990 | Anderson et al. |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,126,836 A | 6/1992 | Um |
| 5,142,405 A | 8/1992 | Hornbeck |
| 5,142,414 A | 8/1992 | Koehler |
| 5,148,157 A | 9/1992 | Florence |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,185,660 A | 2/1993 | Um |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,244,707 A | 9/1993 | Shores |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,304,419 A | 4/1994 | Shores |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,353,114 A | 10/1994 | Hansen |
| 5,358,601 A | 10/1994 | Cathey |
| 5,365,283 A | 11/1994 | Doherty et al. |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,450,205 A | 9/1995 | Sawin et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,530,240 A | 6/1996 | Larson et al. |
| 5,535,047 A | 7/1996 | Hornbeck |
| 5,548,301 A | 8/1996 | Kornher et al. |
| 5,550,373 A | 8/1996 | Cole et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,580,144 A | 12/1996 | Stroomer |
| 5,581,272 A | 12/1996 | Conner et al. |
| 5,583,688 A | 12/1996 | Hornbeck |
| 5,589,852 A | 12/1996 | Thompson et al. |
| 5,591,379 A | 1/1997 | Shores |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |

| | | | | | | |
|---|---|---|---|---|---|---|
| 5,610,624 | A | 3/1997 | Bhuva | 6,496,122 B2 | 12/2002 | Sampsell |
| 5,610,625 | A | 3/1997 | Sampsell | 6,545,335 B1 | 4/2003 | Chua et al. |
| 5,619,059 | A | 4/1997 | Li et al. | 6,548,908 B2 | 4/2003 | Chua et al. |
| 5,619,365 | A | 4/1997 | Rhoads et al. | 6,549,195 B2 | 4/2003 | Hikida et al. |
| 5,619,366 | A | 4/1997 | Rhoads et al. | 6,549,338 B1 | 4/2003 | Wolverton et al. |
| 5,629,521 | A | 5/1997 | Lee et al. | 6,552,840 B2 | 4/2003 | Knipe |
| 5,629,790 | A | 5/1997 | Neukermans et al. | 6,574,033 B1 | 6/2003 | Chui et al. |
| 5,636,052 | A | 6/1997 | Arney et al. | 6,589,625 B1 | 7/2003 | Kothari et al. |
| 5,636,185 | A | 6/1997 | Brewer et al. | 6,600,201 B2 | 7/2003 | Hartwell et al. |
| 5,646,768 | A | 7/1997 | Kaeriyama | 6,606,175 B1 | 8/2003 | Sampsell et al. |
| 5,650,881 | A | 7/1997 | Hornbeck | 6,625,047 B2 | 9/2003 | Coleman, Jr. |
| 5,654,741 | A | 8/1997 | Sampsell et al. | 6,630,786 B2 | 10/2003 | Cummings et al. |
| 5,657,099 | A | 8/1997 | Doherty et al. | 6,632,698 B2 | 10/2003 | Ives |
| 5,659,374 | A | 8/1997 | Gale, Jr. et al. | 6,643,069 B2 | 11/2003 | Dewald |
| 5,665,997 | A | 9/1997 | Weaver et al. | 6,650,455 B2 | 11/2003 | Miles |
| 5,673,139 | A | 9/1997 | Johnson | 6,666,561 B1 | 12/2003 | Blakley |
| 5,683,591 | A | 11/1997 | Offenberg | 6,674,090 B1 | 1/2004 | Chua et al. |
| 5,699,074 | A | 12/1997 | Sutherland et al. | 6,674,562 B1 | 1/2004 | Miles et al. |
| 5,703,710 | A | 12/1997 | Brinkman et al. | 6,680,792 B2 | 1/2004 | Miles |
| 5,710,656 | A | 1/1998 | Goossen | 6,710,908 B2 | 3/2004 | Miles et al. |
| 5,726,480 | A | 3/1998 | Pister | 6,737,979 B1 | 5/2004 | Smith et al. |
| 5,739,945 | A | 4/1998 | Tayebati | 6,741,377 B2 | 5/2004 | Miles |
| 5,745,193 | A | 4/1998 | Urbanus et al. | 6,741,384 B1 | 5/2004 | Martin et al. |
| 5,745,281 | A | 4/1998 | Yi et al. | 6,741,503 B1 | 5/2004 | Farris et al. |
| 5,771,116 | A | 6/1998 | Miller et al. | 6,747,785 B2 | 6/2004 | Chen et al. |
| 5,784,190 | A | 7/1998 | Worley | 6,747,800 B1 | 6/2004 | Lin |
| 5,784,212 | A | 7/1998 | Hornbeck | 6,762,873 B1 | 7/2004 | Coker et al. |
| 5,793,504 | A | 8/1998 | Stoll | 6,775,174 B2 | 8/2004 | Huffman et al. |
| 5,808,780 | A | 9/1998 | McDonald | 6,778,155 B2 | 8/2004 | Doherty et al. |
| 5,815,141 | A | 9/1998 | Phares | 6,794,119 B2 | 9/2004 | Miles |
| 5,818,095 | A | 10/1998 | Sampsell | 6,811,267 B1 | 11/2004 | Allen et al. |
| 5,825,528 | A | 10/1998 | Goossen | 6,819,469 B1 | 11/2004 | Koba |
| 5,835,255 | A | 11/1998 | Miles | 6,822,628 B2 | 11/2004 | Dunphy et al. |
| 5,842,088 | A | 11/1998 | Thompson | 6,829,132 B2 | 12/2004 | Martin et al. |
| 5,912,758 | A | 6/1999 | Knipe et al. | 6,853,129 B1 | 2/2005 | Cummings et al. |
| 5,943,158 | A | 8/1999 | Ford et al. | 6,855,610 B2 | 2/2005 | Tung et al. |
| 5,945,980 | A | 8/1999 | Moissev et al. | 6,859,218 B1 | 2/2005 | Luman et al. |
| 5,977,945 | A | 11/1999 | Ohshima | 6,861,277 B1 | 3/2005 | Monroe et al. |
| 5,986,796 | A | 11/1999 | Miles | 6,862,022 B2 | 3/2005 | Slupe |
| 6,028,690 | A | 2/2000 | Carter et al. | 6,862,029 B1 | 3/2005 | D'Souza et al. |
| 6,038,056 | A | 3/2000 | Florence et al. | 6,867,896 B2 | 3/2005 | Miles |
| 6,040,937 | A | 3/2000 | Miles | 6,870,581 B2 | 3/2005 | Li et al. |
| 6,049,317 | A | 4/2000 | Thompson et al. | 6,870,654 B2 | 3/2005 | Lin et al. |
| 6,055,090 | A | 4/2000 | Miles | 6,882,458 B2 | 4/2005 | Lin et al. |
| 6,061,075 | A | 5/2000 | Nelson et al. | 6,882,461 B1 | 4/2005 | Tsai et al. |
| 6,099,132 | A | 8/2000 | Kaeriyama | 6,912,022 B2 | 6/2005 | Lin et al. |
| 6,100,872 | A | 8/2000 | Aratani et al. | 6,952,303 B2 | 10/2005 | Lin et al. |
| 6,113,239 | A | 9/2000 | Sampsell et al. | 6,958,847 B2 | 10/2005 | Lin |
| 6,147,790 | A | 11/2000 | Meier et al. | 7,061,678 B1 * | 6/2006 | Chikazawa ............ 359/464 |
| 6,160,833 | A | 12/2000 | Floyd et al. | 7,123,216 B1 | 10/2006 | Miles |
| 6,180,428 | B1 | 1/2001 | Peeters et al. | 7,138,984 B1 | 11/2006 | Miles |
| 6,201,633 | B1 | 3/2001 | Peeters et al. | 7,280,265 B2 | 10/2007 | Miles |
| 6,222,511 | B1 | 4/2001 | Stoller et al. | 2001/0003487 A1 | 6/2001 | Miles |
| 6,232,936 | B1 | 5/2001 | Gove et al. | 2001/0050666 A1 | 12/2001 | Huang et al. |
| 6,242,989 | B1 | 6/2001 | Barber et al. | 2002/0012159 A1 | 1/2002 | Tew |
| 6,243,149 | B1 | 6/2001 | Swanson et al. | 2002/0015215 A1 | 2/2002 | Miles |
| 6,275,220 | B1 | 8/2001 | Nitta | 2002/0024711 A1 | 2/2002 | Miles |
| 6,282,010 | B1 | 8/2001 | Sulzbach et al. | 2002/0041264 A1 | 4/2002 | Quanrud |
| 6,295,048 | B1 | 9/2001 | Ward et al. | 2002/0054424 A1 | 5/2002 | Miles |
| 6,295,154 | B1 | 9/2001 | Laor et al. | 2002/0075555 A1 | 6/2002 | Miles |
| 6,304,297 | B1 | 10/2001 | Swan | 2002/0126364 A1 | 9/2002 | Miles |
| 6,307,194 | B1 | 10/2001 | Fitzgibbons et al. | 2002/0149828 A1 | 10/2002 | Miles |
| 6,323,982 | B1 | 11/2001 | Hornbeck | 2002/0171610 A1 | 11/2002 | Siwinski et al. |
| 6,339,417 | B1 | 1/2002 | Quanrud | 2002/0175284 A1 | 11/2002 | Vilain |
| 6,395,863 | B2 | 5/2002 | Geaghan | 2002/0181208 A1 | 12/2002 | Credelle et al. |
| 6,424,094 | B1 | 7/2002 | Feldman | 2002/0186209 A1 | 12/2002 | Cok |
| 6,447,126 | B1 | 9/2002 | Hornbeck | 2003/0004272 A1 | 1/2003 | Power |
| 6,465,355 | B1 | 10/2002 | Horsley | 2003/0043157 A1 | 3/2003 | Miles |
| 6,466,354 | B1 | 10/2002 | Gudeman | 2003/0072070 A1 | 4/2003 | Miles |
| 6,466,358 | B2 | 10/2002 | Tew | 2003/0107805 A1 | 6/2003 | Street |
| 6,473,072 | B1 | 10/2002 | Comiskey et al. | 2003/0112507 A1 * | 6/2003 | Divelbiss et al. ............ 359/464 |
| 6,473,274 | B1 | 10/2002 | Maimone et al. | 2003/0117382 A1 | 6/2003 | Pawlowski et al. |
| 6,480,177 | B2 | 11/2002 | Doherty et al. | 2003/0122773 A1 | 7/2003 | Washio et al. |

| | | |
|---|---|---|
| 2003/0128197 A1 | 7/2003 | Turner et al. |
| 2003/0141453 A1 | 7/2003 | Reed et al. |
| 2003/0173504 A1 | 9/2003 | Cole et al. |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0024580 A1 | 2/2004 | Salmonsen et al. |
| 2004/0051929 A1 | 3/2004 | Sampsell et al. |
| 2004/0058532 A1 | 3/2004 | Miles et al. |
| 2004/0080807 A1 | 4/2004 | Chen et al. |
| 2004/0125281 A1 | 7/2004 | Lin et al. |
| 2004/0145049 A1 | 7/2004 | McKinnell et al. |
| 2004/0145811 A1 | 7/2004 | Lin et al. |
| 2004/0147056 A1 | 7/2004 | McKinnell et al. |
| 2004/0147198 A1 | 7/2004 | Lin et al. |
| 2004/0150939 A1 | 8/2004 | Huff |
| 2004/0160143 A1 | 8/2004 | Shreeve et al. |
| 2004/0174583 A1 | 9/2004 | Chen et al. |
| 2004/0175577 A1 | 9/2004 | Lin et al. |
| 2004/0179281 A1 | 9/2004 | Reboa |
| 2004/0207897 A1 | 10/2004 | Lin |
| 2004/0209192 A1 | 10/2004 | Lin et al. |
| 2004/0209195 A1 | 10/2004 | Lin |
| 2004/0212026 A1 | 10/2004 | Van Brocklin et al. |
| 2004/0217378 A1 | 11/2004 | Martin et al. |
| 2004/0217919 A1 | 11/2004 | Piehl et al. |
| 2004/0218251 A1 | 11/2004 | Pichl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2004/0263968 A1* | 12/2004 | Kobayashi et al. .......... 359/462 |
| 2005/0001797 A1 | 1/2005 | Miller et al. |
| 2005/0001828 A1 | 1/2005 | Martin et al. |
| 2005/0002082 A1 | 1/2005 | Miles |
| 2005/0003667 A1 | 1/2005 | Lin et al. |
| 2005/0017177 A1 | 1/2005 | Tai et al. |
| 2005/0017942 A1 | 1/2005 | Tsujino et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0036192 A1 | 2/2005 | Lin et al. |
| 2005/0038950 A1 | 2/2005 | Adelmann |
| 2005/0042117 A1 | 2/2005 | Lin |
| 2005/0046922 A1 | 3/2005 | Lin et al. |
| 2005/0046948 A1 | 3/2005 | Lin |
| 2005/0057442 A1 | 3/2005 | Way |
| 2005/0068254 A1 | 3/2005 | Booth |
| 2005/0068583 A1 | 3/2005 | Gutkowski et al. |
| 2005/0068605 A1 | 3/2005 | Tsai |
| 2005/0068606 A1 | 3/2005 | Tsai |
| 2005/0069209 A1 | 3/2005 | Damera-Venkata et al. |
| 2005/0078348 A1 | 4/2005 | Lin |
| 2005/0168849 A1 | 8/2005 | Lin |
| 2005/0195462 A1 | 9/2005 | Lin |
| 2005/0202649 A1 | 9/2005 | Hung et al. |
| 2007/0023851 A1 | 2/2007 | Hartzell et al. |
| 2007/0132843 A1 | 6/2007 | Miles |

FOREIGN PATENT DOCUMENTS

| | | |
|---|---|---|
| EP | 0608056 A1 | 7/1994 |
| EP | 0 649 010 | 4/1995 |
| EP | 0667548 | 8/1995 |
| EP | 0 725 380 | 8/1996 |
| EP | 0986077 A2 | 3/2000 |
| EP | 1067805 A2 | 1/2001 |
| JP | 3109524 A | 5/1991 |
| JP | 405275401 | 10/1993 |
| JP | 10161630 A | 6/1998 |
| TW | 157313 | 5/1991 |
| WO | WO 94/29840 A1 | 12/1994 |
| WO | WO 95/30924 | 11/1995 |
| WO | WO 97/17628 | 5/1997 |
| WO | WO 99/52006 A2 | 10/1999 |
| WO | WO 99/52006 A3 | 10/1999 |
| WO | WO 02/063602 A1 | 8/2002 |
| WO | WO 03/007049 A1 | 1/2003 |
| WO | WO 03/069413 A1 | 8/2003 |
| WO | WO 03/073151 A1 | 9/2003 |
| WO | WO 2004/006003 A1 | 1/2004 |
| WO | WO 2004/026757 A2 | 4/2004 |
| WO | WO 2004/066256 | 8/2004 |
| WO | WO 2004/075526 A2 | 9/2004 |

OTHER PUBLICATIONS

Akasaka, "Three-Dimensional IC Trends," Proceedings of IEEE, vol. 74, No. 12, pp. 1703-1714 (Dec. 1986).

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani et al., "Surface Micromachined Tuneable Interferometer Array," Sensors and Actuators, pp. 17-23 (1994).

Billard, C.; "Tunable Capacitor," 5h Annual Review of LETI, Jun. 24, 2003, p. 7.

Bouchaud, Jeremie; Wicht, Henning; "RF MEMES Analysis, Forecasts and Technology Review," Chip Unaxis, date unknown, [online] retrieved from the Internet: <URL:http://semiconductors.unaxis.com/en/download/RF%20MEMS.pdf>.

Chan et al., "Low-Actuation Voltage RF MEMS Shunt Switch With Cold Switching Lifetime of Seven Billion Cycles," Journal of Microelectromechanical Systems vol. 12, No. 5 (Oct. 2003).

Conner, "Hybrid Color Display Using Optical Interference Filter Array," SID Digest, pp. 577-580 (1993).

De Coster et al., "Variable RF MEMS Capacitors With Extended Tuning Range", IEEE International Solid-State Sensors and Actuators Conference, Boston, (Jun. 8-12, 2003).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters (Sep. 1994).

Gosch, "West Germany Grabs the Lead in X-Ray Lithography," Electronics, pp. 78-80 (Feb. 5, 1987).

Heines et al, "Bi-Stable Flat-Panel Display Based on a 180 [DEG.] Flipping Pixel", Conference: Displays IX: Displays for Defense Applications, (Apr. 2-5, 2002), Proceedings of the SPIE: The International Society for Optical Engineering, vol. 4712, pp. 327-335.

Howard et al., "Nanometer-Scale Fabrication Techniques," VLSI Electronics: Microstructure Science, vol. 5, pp. 145-153 and pp. 166-173 (1982).

Jackson, "Classical Electrodynamics," John Wiley & Sons Inc., pp. 568-573 (date unknown).

Jerman et al., "A Miniature Fabry-Perot Interferometer with a Corrugated Silicon Diaphragm Support," IEEE Electron Devices Society (1988).

Johnson "Optical Scanners," Microwave Scanning Antennas, vol. 1, pp. 251-261 (1964).

Li, G.P. "On the design and Fabrication of Electrostatic RF MEMS Switches," Final Report 1999-00 for MICRO Project 99-071, University of California, Irvine.

Light over Matter, Circle No. 36 (Jun. 1993).

Mait, "Design of Diffractive Optical Elements for Optical Signal Processing", IEEE Lasers and Electro-Optics Society Annual Meeting, pp. 59-60, (Nov. 15-18, 1993).

Miles, "A New Reflective FPD Technology Using Interferometric Modulation," Society for Information Display '97 Digest, Session 7.3.

Newsbreaks, "Quantum-trench devices might operate at terahertz frequencies," Laser Focus World (May 1993).

Nieminen, Heikki, Ermolov, Vladimir; Silanto, Samuli; Nybergh, Kjell; Rhanen, Tapani; "Design of a Temperature-Stable RF MEM Capacitor," Institute of Electrical and Electronics Engineers (IEEE) Journal of Microelectromechanical Systems, vol. 13, No. 5, Oct. 2004, pp. 705-714.

Oliner et al., "Radiating Elements and Mutual Coupling," Microwave Scanning Antennas, vol. 2, p. 131-194 (1966).

Oz et al., "CMOS-Compatible RF-MEMS Tunable Capacitors", IEEE MTT-S International Microwave Symposium—IMS 2003, (Jun. 8-13, 2003).

Pacheco et al. "Design of Low Actuation Voltage RF MEMS Switch" Radiation Laboratory and Center for Microsystems Department of Electrical Engineering and Computer Science University of Michigan, IEEE (2000) 0/7803-5687-X/00/.

Raley et al., "A Fabry-Perot Microinterferometer for Visible Wavelengths," IEEE Solid-State Sensor and Actuator Workshop, Hilton Head, SC (1992).

Solgaard et al., "Interference-Based Optical MEMS Filters", Optical 2004 Fiber Communication Conference, vol. 1, (Feb. 23-27, 2004).

Sperger et al., "High Performance Patterned All-Dielectric Interference Colour Filter for Display Applications," SID Digest, pp. 81-83 (1994).

Stone, "Radiation and Optics, An Introduction to the Classical Theory," McGraw-Hill, pp. 340-343 (1963).

Tan et al. "RF MEMS Simulation-High Isolation CPW Shunt Switches", Ansoft: Global Seminars: Delivering Performance (2003).

Vähä-Heikkilä et al. "Design of Capacitive RF MEMS Power Sensor" VTT Information Technology, (2002), available at <http://www.hut.fi/Units/Radio/URSI02/ursi_vaha-heikkila.pdf>.

Walker, et al., "Electron-beam-tunable Interference Filter Spatial Light Modulator," Optics Letters vol. 13, No. 5, pp. 345-347 (May 1988).

Wang et al., "Design and Fabrication of a Novel Two-Dimension MEMS-Based Tunable Capacitor", IEEE 2002 International Conference on Communications, Circuits and Systems and West Sino Expositions, vol. 2, pp. 1766-1769, (Jun. 29-Jul. 1, 2002).

Winton, John M., "A novel way to capture solar energy," Chemical Week, pp. 17-18 (May 15, 1985).

Wu, "Design of a Reflective Color LCD Using Optical Interference Reflectors," ASIA Display '95, pp. 929-931 (Oct. 16, 1995).

Bass, "Handbook of Optics, vol. I, Fundamentals, Techniques, and Design, Second Edition," McGraw-Hill, Inc., New York, pp. 2.29-2.36 (1995).

Ibotson, et al. "Comparison of XeF2, and F-atom reactions with Si and SiO2, Applied Physics Letters." vol. 44, No. 12, Jun. 1984. pp. 1129-1131.

Schnakenberg, et al. "THAHW Etchants for Silicon Micromachining." 1991 International Conference on Solid State Sensors and Actuators—Digest of Technical Papers. pp. 815-818.

Williams, et al. Etch Rates for Michromachining Processing—Journal of Microelectromechanical Systems. vol. 5 No. 4, Dec. 1996, pp. 256-269.

Winters, et al., "The Etching of Silicon with XeF2 Vapor." Applied Physics Letters, vol. 34. No. 1, Jan. 1979, pp. 70-73.

Austrian Search Report from U.S. Appl. No. 11/097,509, Jul. 14, 2005.

Austrian Search Report from U.S. Appl. No. 11/097,509, Jul. 29, 2005.

Austrian Search Report from U.S. Appl. No. 11/096,546, May 19, 2005.

Austrian Search Report from U.S. Appl. No. 11/140,560, Aug. 11, 2005.

Austrian Search Report from U.S. Appl. No. 11/066,724, May 13, 2005.

Austrian Search Report from U.S. Appl. No. 11/097,818, Jul. 14, 2005.

Austrian Search Report from U.S. Appl. No. 11/097,820, Jun. 29, 2005.

Mark W. Miles, "MEMS-based interferometric modulator for display applications," Proceedings of SPIE, vol. 3876, Aug. 1999, pp. 20-28.

Office Action dated Apr. 25, 2008 in Chinese App. No. 200510105838.8

Office Action dated Jul. 17, 2009 in Chinese App. No. 200510105838.8.

* cited by examiner

|  | Column Output Signals | |
|---|---|---|
|  | $+V_{bias}$ | $-V_{bias}$ |
| Row Output Signals    0 | Stable | Stable |
| $+\Delta V$ | Release | Actuate |
| $-\Delta V$ | Actuate | Release |

SYSTEM AND METHOD FOR IMPLEMENTATION OF INTERFEROMETRIC MODULATOR DISPLAYS

CROSS REFERENCE TO RELATED APPLICATIONS

This application claims priority to U.S. Provisional Application No. 60/613,298, titled "System and Method for Implementation of Interferometric Modulator Displays," filed Sep. 27, 2004, which is incorporated by reference, in its entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment includes a system for displaying to a user a stereoscopic image including first and second images. The system includes at least a first pixel formed on a single substrate. Each pixel includes at least a first interferometric modulator. The system is configured to display the first image to a first eye of the user and to display the second image to a second eye of the user. In one embodiment the first and second images are displayed substantially simultaneously.

Another embodiment includes a display device, including an array of pixels formed on a single substrate. Each pixel includes one or more interferometric modulators, and the array is configured to substantially simultaneously display first and second images. The first image is directed to a first destination and the second image is directed to a second destination.

Still another embodiment includes a display device which includes at least first and second interferometric modulators formed on a single substrate. The first interferometric modulator includes two reflective layers formed in substantially parallel first and second planes, and the second interferometric modulator includes two reflective layers formed in substantially parallel third and fourth planes. An intersection of the first or second planes with the third or fourth planes forms an angle in a plane perpendicular to the line formed by the intersection, and angle is between 10 and 170 degrees.

Yet another embodiment includes a display device including at least first and second interferometric modulators formed on a single substrate. The first interferometric modulator includes two reflective layers formed in substantially parallel first and second planes; and the second interferometric modulator includes two reflective layers formed in substantially parallel third and fourth planes. The first, second, third, and fourth planes are separate and substantially parallel planes.

Yet another embodiment includes a display device including at least first and second interferometric modulators formed on a single substrate. The substrate defines a first plane. The first interferometric modulator includes a first reflective layer formed in the first plane and a second reflective layer formed in a second plane. The second interferometric modulator includes a third reflective layer formed in the first plane and a fourth reflective layer formed in a third plane. The second and third planes are separate and substantially parallel planes not parallel to the first plane.

Yet another embodiment includes a method of making a display device including forming at least first and second interferometric modulators on a single substrate. The first interferometric modulator includes two reflective layers formed in substantially parallel first and second planes. And the second interferometric modulator includes two reflective layers formed in substantially parallel third and fourth planes. Also, the first, second, third, and fourth planes are separate and substantially parallel planes.

Yet another embodiment includes a method of making a display device including forming at least first and second interferometric modulators on a single substrate, where the substrate defines a first plane. The first interferometric modulator includes a first reflective layer formed in the first plane and a second reflective layer formed in a second plane. The second interferometric modulator includes a third reflective layer formed in the first plane and a fourth reflective layer formed in a third plane. The second, and third planes are separate and substantially parallel planes not parallel to the first plane.

Still another embodiment includes a method of displaying to a user a stereoscopic image comprising first and second images. The method includes providing a system including an array of interferometric modulators configured to display stereoscopic images. The method also includes sending electrical signals corresponding to the first and second images to the array.

Yet another embodiment includes a display having interferometric modulators configured to display a stereoscopic image. It also includes a processor that is in electrical communication with the display, and is configured to process image data. The display also includes a memory device in electrical communication with said processor.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

In one embodiment, a display device includes an array of elements, on which images are displayed. When these elements are configured properly, as further described below, multiple images may be displayed simultaneously. Each image may be shown in a separate direction. The device may be configured to display two images having a stereoscopic relationship, such that when one image is shown to one eye and the other image is shown to the other eye, the display is perceived to be three-dimensional. In other embodiments multiple images are displayed simultaneously such that an observer moving relative to the device sees a sequence of images.

Figure 1:
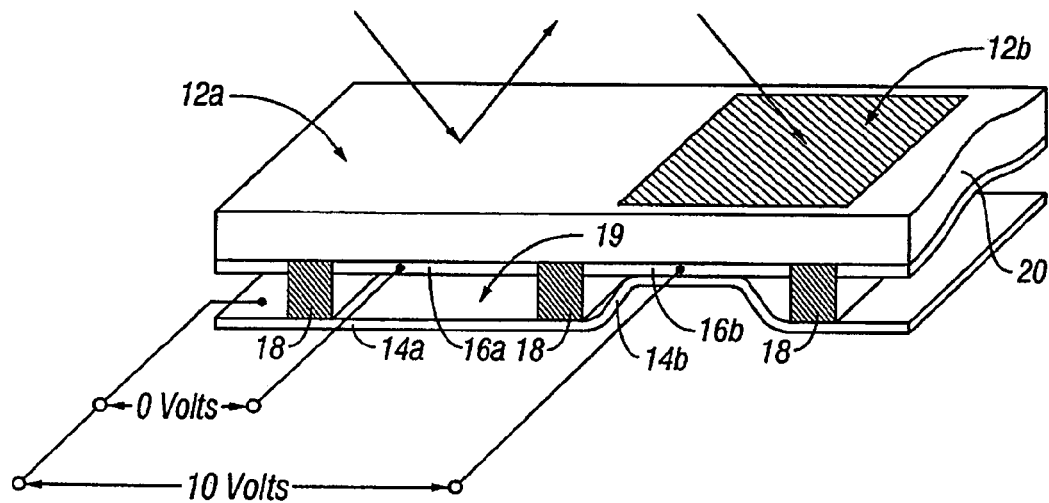
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a relaxed position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers 14a, 14b are separated from the fixed metal layers by a defined gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
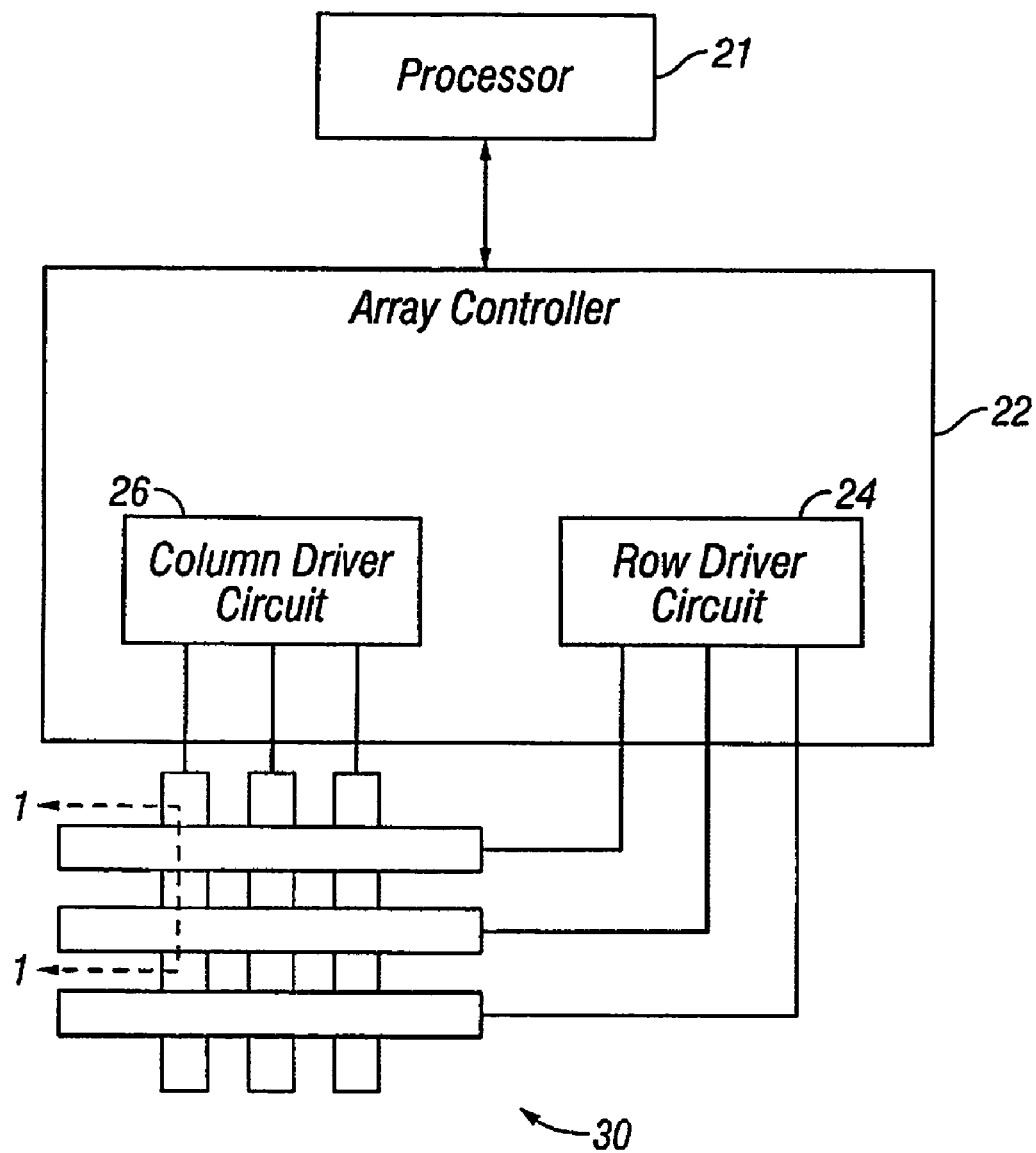
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
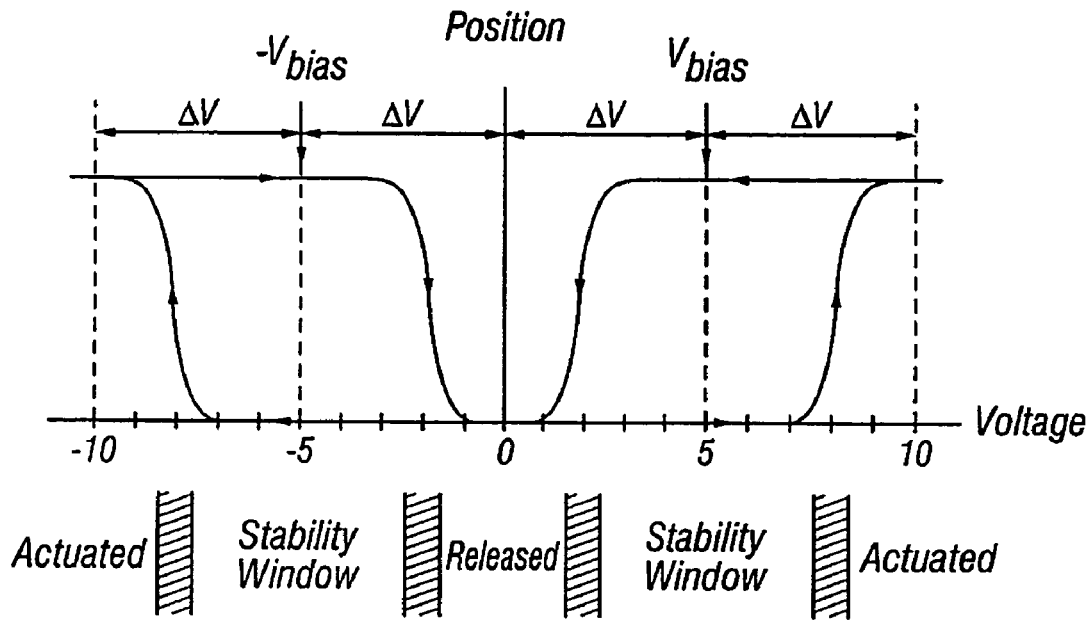
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
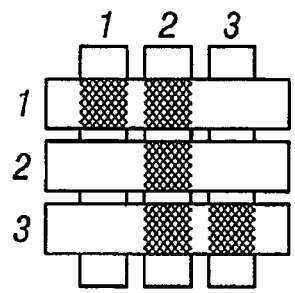
FIGS. 5A and 5B illustrate one exemplary timing diagram for row and column signals that may be used to write a frame of display data to the 3×3 interferometric modulator display of FIG. 2.
Figure 5B:
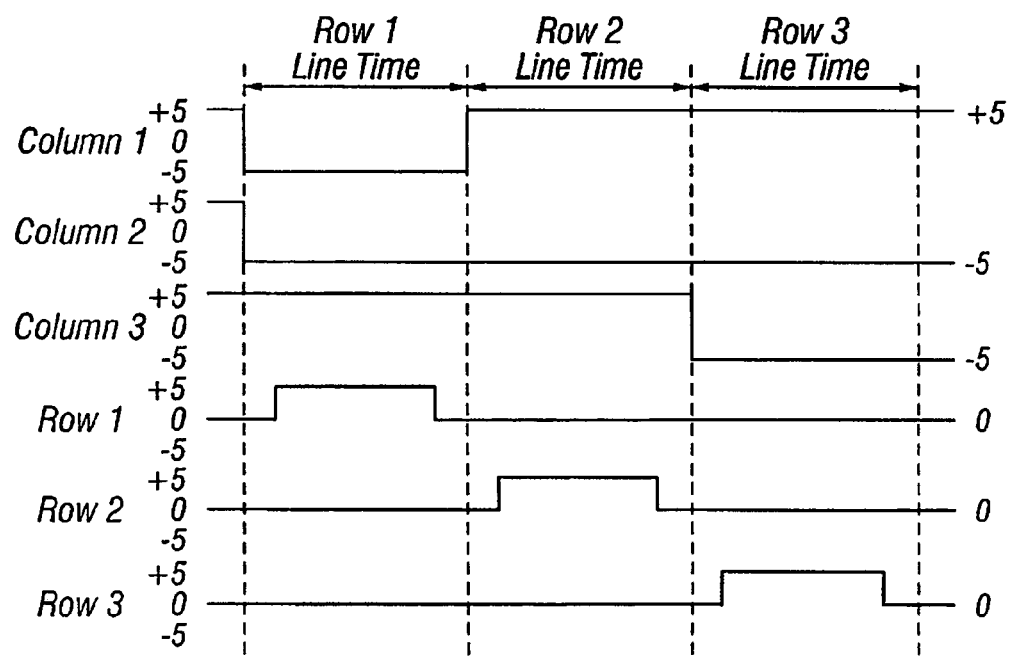

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 11A:
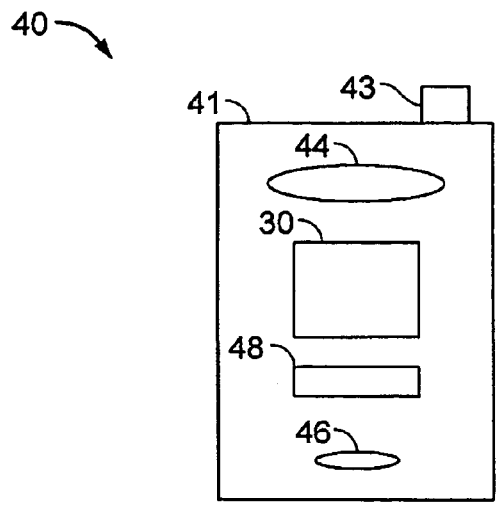
FIG. 11A is a system block diagram illustrating an embodiment of a display device.
Figure 11B:
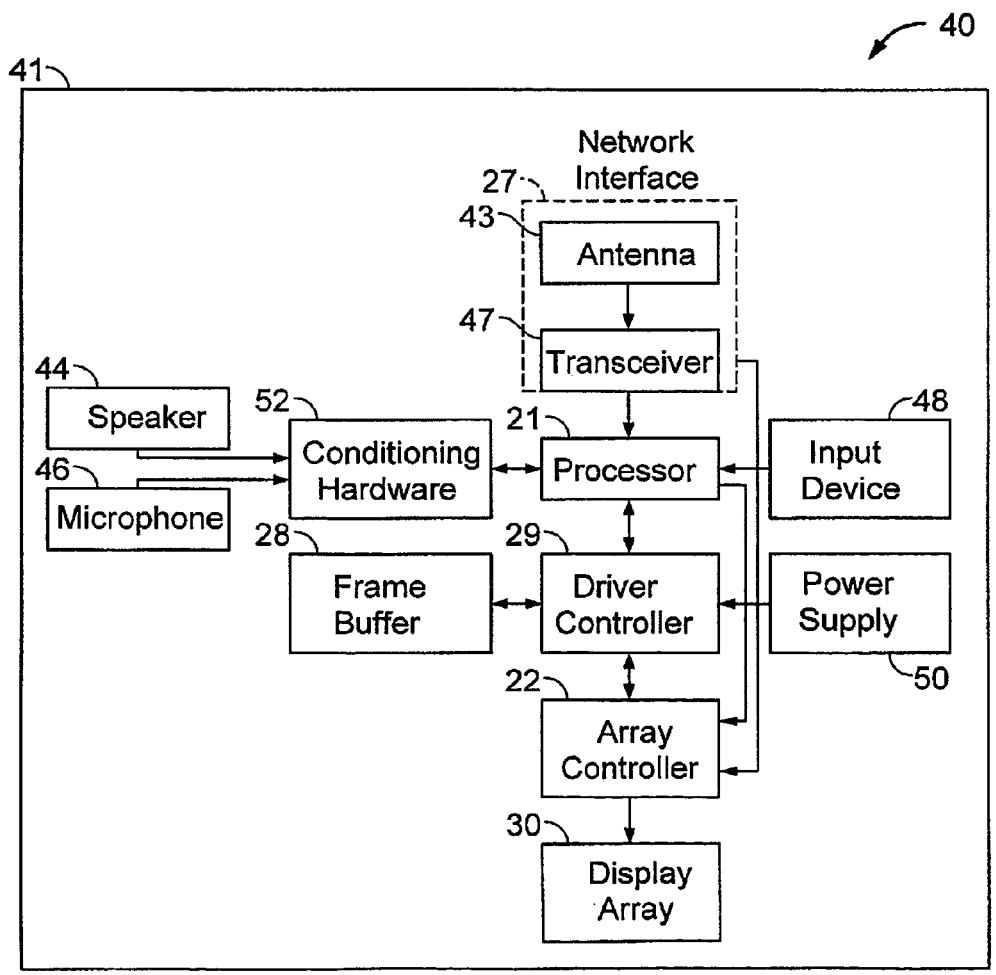
FIG. 11B is a system block diagram illustrating an embodiment of a display device.

FIGS. 11A and 11B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 11B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 44 and a microphone 46. The processor 21 is also connected to an input device 48 and a driver controller 29. The driver controller 29 is coupled to a frame buffer 28, and to an array controller 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUE-TOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 44, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array controller 22. Specifically, the driver controller 29 reformats the raw image data into a data flow having a raster-like format, such that it has a time order suitable for scanning across the display array 30. Then the driver controller 29 sends the formatted information to the array controller 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array controller 22.

Typically, the array controller 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array controller 22, and display array 30 are appropriate for any of the types of displays described herein. For example, in one embodiment, driver controller 29 is a conventional display controller or a bi-stable display controller (e.g., an interferometric modulator controller). In another embodiment, array controller 22 is a conventional driver or a bi-stable display driver (e.g., an interferometric modulator display). In one embodiment, a driver controller 29 is integrated with the array controller 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array controller 22. Those of skill in the art will recognize that the above-described optimization may be implemented in any number of hardware and/or software components and in various configurations.

Figure 6A:
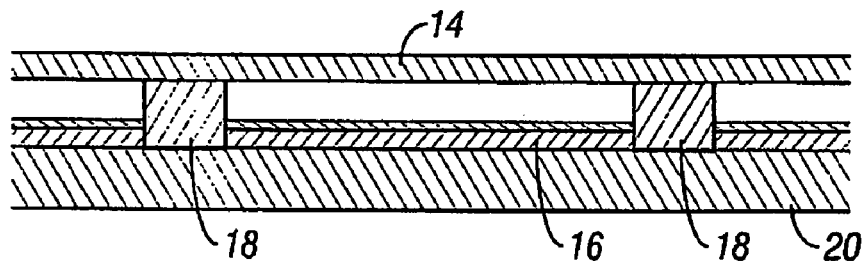
FIG. 6A is a cross section of the device of FIG. 1.
Figure 6B:
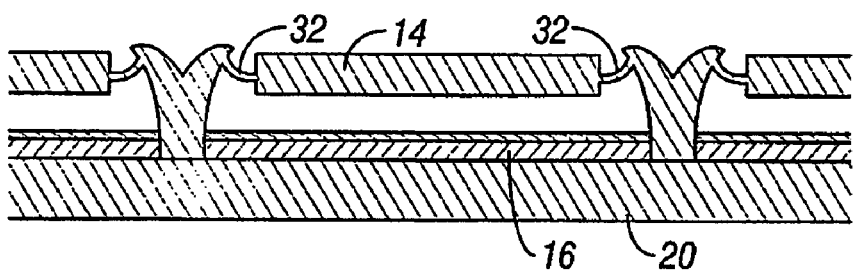
FIG. 6B is a cross section of an alternative embodiment of an interferometric modulator.
Figure 6C:
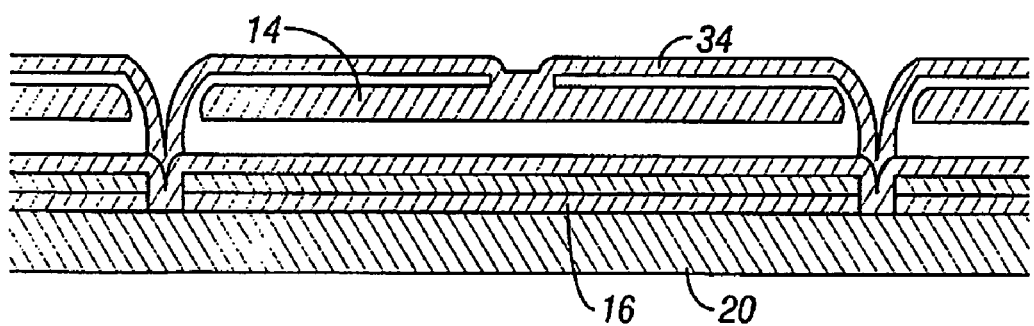
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of known techniques may be used to produce the above described structures involving a series of material deposition, patterning, and etching steps.

FIGS. 6A-6C illustrate embodiments of interferometric modulators in which the substrate 20, the partially reflective layer 16, and the reflective layer 14 are substantially parallel. One or more of these layers may be fabricated so as to not be parallel to the others to achieve advantageous effects, as further described.

Figure 7A:
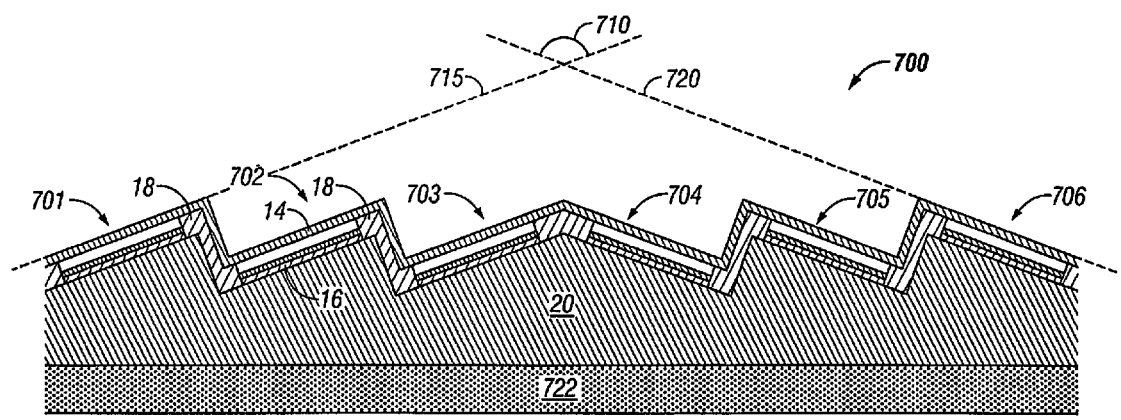
FIG. 7A is a side view of one embodiment of an interferometric modulator array configured such that the interferometric modulators are inclined with respect to the general plane of the substrate.

FIG. 7A shows an array 700 of such an alternative embodiment. In this embodiment of an interferometric modulator, a partially reflective layer 16 and the corresponding reflective layer 14 are substantially parallel to each other, but not to the general plane of the substrate 20. Each reflective layer 14 and its corresponding partially reflective layer 16 are inclined at one of two angles from the general plane of the substrate 20. Two sets of interferometric modulators 701-703, and 704-706 are shown, each positioned in a direction substantially parallel to the others within its set, but not to the general plane of the substrate and not to interferometric modulators of the other set. The effect of these two sets is that incident light is reflected in two different directions. The first and second sets can be positioned relative to each other such that an angle 710 formed by the intersection of a first line 715, in the plane of interferometric modulator 701, and a second line 720, in the plane of interferometric modulator 706, is greater than zero and less than 180 degrees. For example, in some embodiments, one or more sets are positioned such that the angle 710 is less than 5 degrees, equal to or between (in degrees) 5-10, 10-15, 15-20, 20-25, 25-30, 30-35, 35-40, 40-45, 45-50, 50-55, 55-60, 60-65, 70-75, 75-80, 80-85, 85-90, 90-95, 95-100, 100-105, 105-110, 110-115, 115-120, 120-125, 125-130, 130-135, 135-140, 140-145, 145-150, 150-155, 155-160, 160-165, 165-170, 170-175, 175-179, or less than 180 degrees.

In the embodiment shown in FIG. 7A each of these sets forms a pixel. For a color display each pixel may have three colors, one interferometric modulator each for red, green and blue ("RGB"), for example. For a two color display, e.g., black and white, each set can be a grey scale pixel with eight brightness levels.

Figure 7B:
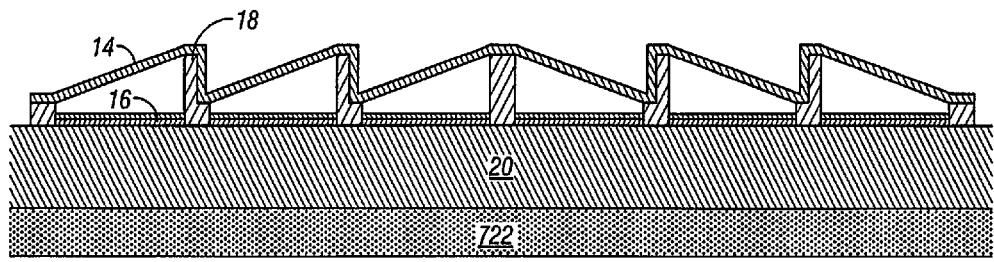
FIG. 7B is a side view of one embodiment of an interferometric modulator array configured such that only the movable layers 14 of the interferometric modulators are inclined with respect to the general plane of the substrate 20.

The array shown in FIG. 7A may also be produced with interferometric modulators of an embodiment wherein the partially reflective layer 16 and the general plane of the substrate 20 are substantially parallel to each other, but not to the corresponding reflective layer 14, as shown in FIG. 7B. This embodiment has similar geometric characteristics as the embodiment of FIG. 7A with respect to light reflection, and therefore also directs light in two different directions. The color qualities of the reflected light, however, are different because of the altered geometry of the interferometric cavities. The effect is that the light reflected has a broader spectrum.

Other embodiments may have interferometric modulators with reflective layer 14 and the general plane of the substrate 20 being substantially parallel to each other, but not to the corresponding the partially reflective layer 16. This embodiment has similar light directing characteristics and color qualities as the embodiment shown in FIG. 7B.

Figure 8:
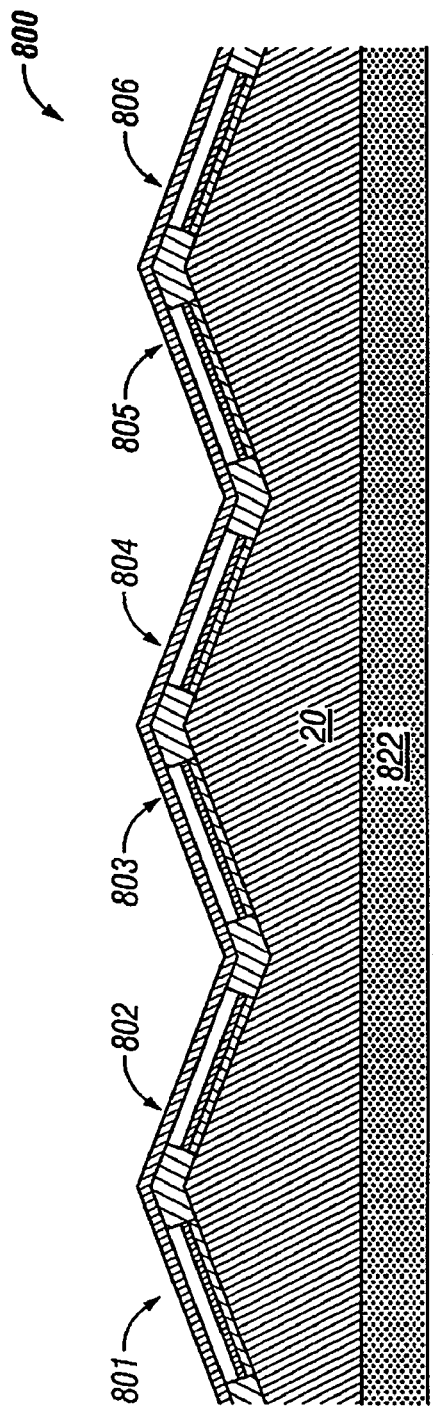
FIG. 8 is a side view of another embodiment of an interferometric modulator array with a different arrangement of colors and pixels.

FIG. 8 shows an interferometric modulator array 800 configured according to an alternative embodiment, wherein the interferometric modulators have a different arrangement than that of FIGS. 7A and 7B. While the interferometric modulators of FIG. 7A or 7B are arranged such that individual interferometric modulators within a single pixel are adjacent, the interferometric modulators of the embodiment of FIG. 8 are arranged such that interferometric modulators configured to display a certain color within a first pixel directing light to a first direction are adjacent to an interferometric modulator configured to display the same color within a second pixel directing light to the second direction. Accordingly, in one embodiment interferometric modulator 801 displays a red color of a first pixel, interferometric modulator 802 displays a red color of a second pixel, interferometric modulator 803 displays a green color of the first pixel, interferometric modulator 804 displays a green color of the second pixel, interferometric modulator 805 displays a blue color of the first pixel, and interferometric modulator 806 displays a blue color of the second pixel, where the first pixel directs light to a first direction and the second pixel directs light to a second direction. In other embodiments the order of the colors may be different, or the arrangement of first and second pixel may be different. In some embodiments the two pixels are corresponding pixels within a stereoscopic image.

Figure 9:
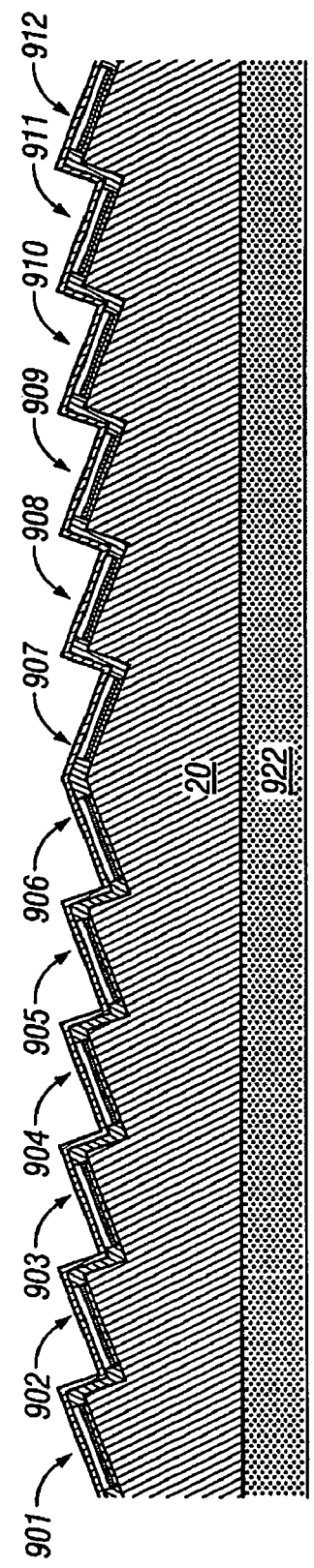
FIG. 9 is a side view of still another embodiment of an interferometric modulator array with a different arrangement of colors and pixels.

FIG. 9 shows an embodiment configured with another arrangement of interferometric modulators. In the embodiment of FIG. 9, the interferometric modulators 901-912 are arranged such that interferometric modulators 901-906 are configured to direct light in a first direction and interferometric modulators 907-912 are configured to direct light in a second direction. In this embodiment multiple pixels directing light in the same direction are adjacent.

The general structure of the interferometric modulators illustrated in FIGS. 7-9 is chosen to be similar to that shown in FIG. 6A for illustrative purposes only. The principles discussed herein will apply to other interferometric modulator structures as well. Other embodiments of modulators which can be configured with inclined mirrors are described in U.S. Pat. No. 5,986,796, entitled "Visible Spectrum Modulator Arrays," U.S. Pat. No. 6,055,090, entitled "Interferometric Modulation," and a commonly-owned application entitled "Area Array Modulation and Lead Reduction in Interferometric Modulators," U.S. Pat. No. 7,161,728, all of which are incorporated herein in their entirety. In various embodiments, there can be numerous sets of interferometric modulators that are positioned adjacent and substantially parallel to each other. The relative angle between the interferometric modulators of pixels directing light in a first direction and the interferometric modulators of pixels directing light in a second direction can vary.

Figure 10:
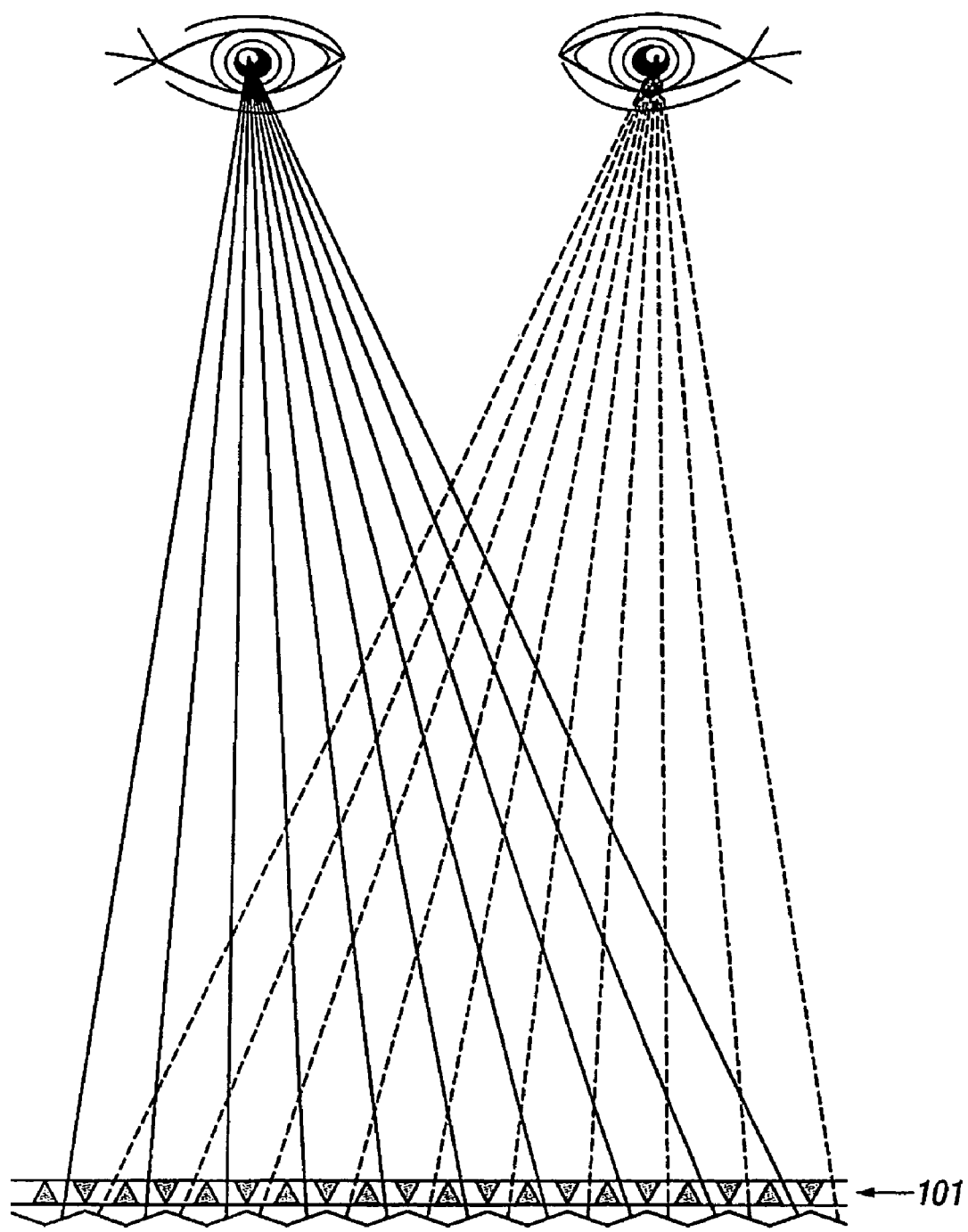
FIG. 10 is an illustration of separate images being directed to individual eyes.

An interferometric modulator array configured with inclined mirrors can be used to form a display for viewing images which appear three-dimensional. The light from interferometric modulators inclined at one angle can be presented to one eye and the light from interferometric modulators inclined at a second angle can be presented to the other eye to display stereoscopic images appearing three-dimensional to a viewer. The amount of angle required to achieve this effect depends on the desired viewing distance of the display. For example, if the viewing distance to a display is very short, the angle of the mirrors can be greater than the angle for a display is viewed at a farther distance. In some embodiments it may be advantageous to obstruct certain light paths which would otherwise cause an image intended for one eye to appear at the other. An embodiment of such an obstruction layer is show as layer 101 in FIG. 10. In some embodiments the positions of the obstructions may be dynamically controlled based on user inputs or inputs from device electronics configured to sense light and geometric attributes of the environment, such as relative strength and position of light sources relative to the device, and distances and angles to and between a users eyes. In some embodiments it may be advantageous to include a substantially diffusive layer between the interferometric modulators and the incident light and/or the user, as shown in FIGS. 7A, 7B layer 722, FIG. 8 layer 822, and FIG. 9 layer 922. The suggested degree of diffusiveness or haze of the layer depends on intended spatial resolution and thickness of the substrate 20.

An interferometric modulator array configured with inclined mirrors can also be used to display a plurality of images, wherein which image seen depends on the angle from which the array is viewed. In one embodiment an array has interferometric modulators inclined at, for example, four different angles, and would therefore produce four different images. An observer moving relative to such an array sequentially sees each of the images. In some embodiments at least some of the images are related such that when seen sequentially they produce a coordinated display, such as a text message or an animated advertisement.

While the above detailed description has shown, described, and pointed out novel features as applied to various embodiments, it will be understood that various omissions, substitutions, and changes in the form and details of the device or processes illustrated may be made by those skilled in the art without departing from the spirit of the invention. As will be recognized, the present invention may be embodied within a form that does not provide all of the features and benefits set forth herein, as some features may be used or practiced separately from others. It should be noted that the use of particular terminology when describing certain features or aspects of the invention should not be taken to imply that the terminology is being re-defined herein to be restricted to include any specific characteristics of the features or aspects of the invention with which that terminology is associated.

What is claimed is:

1. A system for displaying to a user a stereoscopic image comprising first and second images, the system comprising an array of at least first and second pixels formed on a single substrate, wherein each pixel comprises at least one interferometric modulator, and wherein the system is configured to display the first image from the first pixel to particularly a first eye of the user and to display the second image from the second pixel to particularly a second eye of the user, wherein the first and second images are displayed simultaneously to produce an image appearing three-dimensional to the user, wherein the first pixel is supported on the single substrate at a first angle and the second pixel is supported on the single substrate at a second angle that is not parallel to the first angle.

2. The system of claim 1, further comprising a substantially optically diffusive layer between the array and the first and second eyes.

3. The system of claim 1, wherein at least a portion of the array is configured to be substantially specular.

4. The system of claim 1, wherein the at least one interferometric modulator of each pixel comprises at least a first and second interferometric modulators, and wherein the first and second interferometric modulators within each pixel are adjacent to one another.

5. The system of claim 1, wherein the first pixel comprises a first interferometric modulator appearing a color and displaying a portion of the first image, and the second pixel comprises a second interferometric modulator appearing substantially the same color and displaying a portion of the second image, and wherein the first interferometric modulator and the second interferometric modulator are adjacent to one another.

6. The system of claim 1, wherein the array is partitioned into subsections, and wherein interferometric modulators on a first side of each subsection display a portion of the first image, and interferometric modulators on a second side of each subsection display a portion of the second image.

7. The system of claim 1, further comprising a structure configured to substantially obscure the first image from the second eye of the user and to substantially obscure the second image from the first eye of the user.

8. The system of claim 1, further comprising:
a display;
a processor that is in electrical communication with said display, said processor being configured to process image data; and
a memory device in electrical communication with said processor.

9. The system of claim 8, further comprising:
a first controller configured to send at least one signal to said display; and
a second controller configured to send at least a portion of said image data to said first controller.

10. The system of claim 8, further comprising an image source module configured to send said image data to said processor.

11. The system of claim 10, wherein said image source module comprises at least one of a receiver, transceiver, and transmitter.

12. The system of claim 8, further comprising an input device configured to receive input data and to communicate said input data to said processor.

13. A display device, comprising an array of pixels formed on a single substrate, each pixel comprising one or more interferometric modulators, the array being configured to simultaneously display first and second images, wherein the first image is directed to principally a first destination and the second image is directed to principally a second destination, wherein a first pixel is supported on the single substrate at a first angle and a second pixel is supported on the single substrate at a second angle that is not parallel to the first angle.

14. The device of claim 13, wherein the first and second images form a stereoscopic image.

15. The device of claim 13, further comprising a substantially optically diffusive layer between the array and the destinations.

16. The device of claim 13, wherein at least a portion of the array is configured to appear substantially specular to a user.

17. The device of claim 13, wherein interferometric modulators within a single pixel are adjacent.

18. The device of claim 13, wherein the pixels comprise a first pixel and a second pixel, the first pixel comprising a first interferometric modulator appearing a color and displaying a portion of the first image, the second pixel comprising a second interferometric modulator appearing substantially the same color and displaying a portion of the second image, the first interferometric modulator and the second interferometric modulator being adjacent to one another.

19. The device of claim 13, wherein the array is partitioned into subsections, wherein interferometric modulators on a first side of each subsection display a portion of the first image, and interferometric modulators on a second side of each subsection display a portion of the second image.

20. A method of displaying to a user a stereoscopic image comprising first and second images, the method comprising:
providing a system comprising an array of interferometric modulators configured to display stereoscopic images, wherein a first interferometric modulator is supported on a substrate at a first angle and the second interferometric modulator is supported on a substrate at a second angle that is not parallel to the first angle;
sending electrical signals corresponding to the first and second images to the array;
displaying the first image to particularly a first eye of the user in response to the electrical signals; and
simultaneously displaying the second image to particularly a second eye of the user in response to the electrical signals.

21. The method of claim 20, further comprising:
substantially obscuring the first image from the second eye of the user; and
substantially obscuring the second image from the first eye of the user.

22. The method of claim 20, further comprising diffusing the displayed image.

23. A system for displaying to a user a stereoscopic image comprising first and second images, the system comprising an array of at least first and second means for displaying a portion of an image formed on a single substrate, wherein the system is configured to display the first image from the first means to particularly a first eye of the user and to display the second image from the second means to particularly a second eye of the user, wherein the first and second images are displayed simultaneously to produce an image appearing three-dimensional to the user, wherein the first means is supported on the single substrate at a first angle and the second means is supported on the single substrate at a second angle that is not parallel to the first angle.

24. The system of claim 23, further comprising a substantially optically diffusive layer between the array and the first and second eyes.

25. The system of claim 23, wherein at least a portion of the array is configured to be substantially specular.

26. A system for displaying to a user a stereoscopic image comprising first and second images, the system being made by a process comprising:
forming an array of at least first and second pixels on a single substrate, wherein each pixel comprises at least one interferometric modulator, and wherein the first pixel is configured to display the first image to particularly a first eye of the user and the second pixel is configured to display the second image to particularly a second eye of the user, wherein the first and second images are displayed simultaneously to produce an image appearing three-dimensional to the user, wherein the first pixel is supported on the single substrate at a first angle and the second pixel is supported on the single substrate at a second angle that is not parallel to the first angle.

27. The system of claim 26, the process further comprising forming a substantially optically diffusive layer between the array and the first and second eyes.

28. The system of claim 26, wherein at least a portion of the array is configured to be substantially specular.

* * * * *

UNITED STATES PATENT AND TRADEMARK OFFICE
CERTIFICATE OF CORRECTION

| | | |
|---|---|---|
| PATENT NO. | : 7,808,703 B2 | Page 1 of 1 |
| APPLICATION NO. | : 11/140560 | |
| DATED | : October 5, 2010 | |
| INVENTOR(S) | : Brian J. Gally | |

It is certified that error appears in the above-identified patent and that said Letters Patent is hereby corrected as shown below:

Title Page item 56

Title Page 4, Column 2, Line 24, change "5h" to --5th--.

Title Page 4, Column 2, Line 26, change "MEMES" to --MEMS--.

Title Page 4, Column 2, Line 68, change "lnterferometric" to --Interferometric--.

Title Page 5, Column 1, Line 32, change "/URSI02/" to --/URSIO2/--.

Title Page 5, Column 2, Line 9, change "Si02," to --SiO2,--.

Title Page 5, Column 2, Line 11, change ""THAHW" to --"THAW--.

Title Page 5, Column 2, Line 14, change "Michromachining" to --Micromachining--.

At Column 1, Line 22, change "and or" to --and/or--.

At Column 6, Line 42, change "respectively" to --respectively.--.

At Column 7, Line 62, change "ore" to --or--.

Signed and Sealed this

Twenty-first Day of June, 2011

David J. Kappos
*Director of the United States Patent and Trademark Office*